Figure 1:
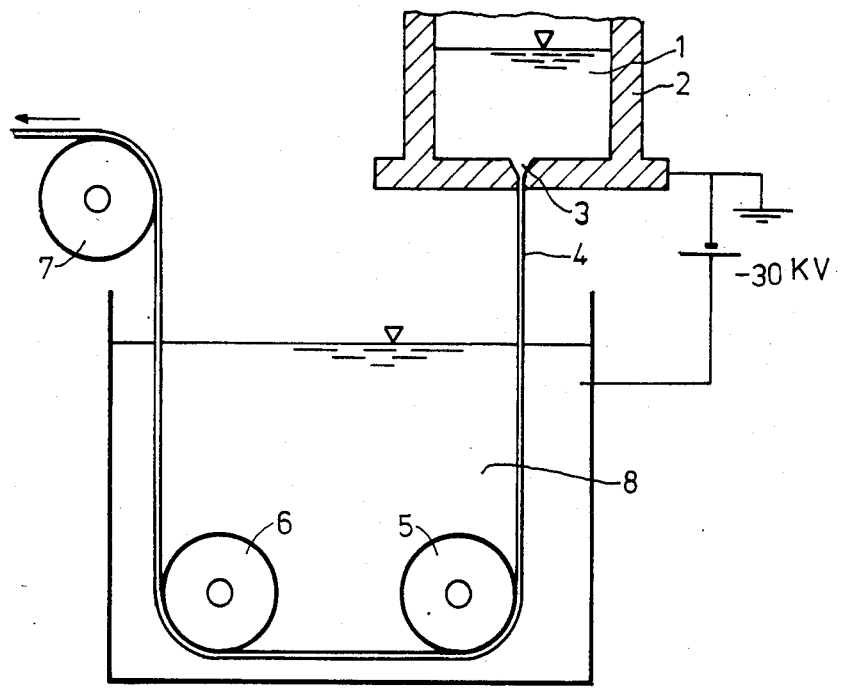

United States Patent [19]

Weber et al.

[11] Patent Number: 4,668,448
[45] Date of Patent: May 26, 1987

[54] THERMOPLASTIC PROCESSING OF THERMOTROPIC LIQUID-CRYSTALLINE POLYMERS UNDER THE INFLUENCE OF ELECTRIC FIELDS

[75] Inventors: Gunter Weber; Hans-Rudolf Dicke, both of Krefeld; Roland Vogelsgesang; Walter Simm, both of Leverkusen; Hermann Brinkmeyer, Krefeld, all of Fed. Rep. of Germany

[73] Assignee: Bayer Aktiengesellschaft, Fed. Rep. of Germany

[21] Appl. No.: 760,463

[22] Filed: Jul. 30, 1985

[30] Foreign Application Priority Data

Aug. 10, 1984 [DE] Fed. Rep. of Germany ....... 3429431

[51] Int. Cl.$^4$ .............................................. B29C 35/10
[52] U.S. Cl. ........................................ 264/22; 264/24; 264/27; 264/178 F; 264/211.14; 264/331.21; 264/348; 425/174.6; 425/174.8 E
[58] Field of Search ............... 264/24, 22, 27, 176 F, 264/331.21, 345, 211.14, 178 F, 348; 425/174.8 R, 174.8 E, 174.6

[56] References Cited

U.S. PATENT DOCUMENTS

| | | | |
|---|---|---|---|
| 2,420,864 | 5/1947 | Chikowsky | 264/24 |
| 2,908,545 | 10/1959 | Teja | 264/24 |
| 3,626,041 | 12/1971 | Fields et al. | 264/24 |
| 3,778,410 | 12/1973 | Kuhfuss et al. | 264/331.21 |
| 3,867,299 | 2/1975 | Rohatgi | 425/174.8 R |
| 4,000,229 | 12/1976 | Wainer | 264/24 |
| 4,183,895 | 1/1980 | Luise | 264/176 F |
| 4,247,514 | 1/1981 | Luise | 264/345 |
| 4,266,918 | 5/1981 | Manley | 425/174.8 E |
| 4,325,903 | 4/1982 | Wissbrun et al. | 264/176 F |
| 4,486,365 | 12/1984 | Kliemann et al. | 425/174.8 E |
| 4,526,735 | 7/1985 | Norota et al. | 425/174.6 |

FOREIGN PATENT DOCUMENTS

| | | | |
|---|---|---|---|
| 3312487 | 10/1984 | Fed. Rep. of Germany | 264/27 |
| 46-19553 | 6/1971 | Japan | 264/24 |
| 59-26511 | 2/1984 | Japan | 264/24 |
| 59-47410 | 3/1984 | Japan | 425/174.8 E |
| 59-26510 | 10/1984 | Japan | 264/24 |

*Primary Examiner*—Jeffery Thurlow
*Attorney, Agent, or Firm*—Connolly and Hutz

[57] ABSTRACT

The processing by shaping, in particular includes here the moulding, spinning, extrusion, compression and injection moulding of polymers. An electric field thereby influences the flowing polymer melt before and/or during and/or after shaping. The temperature of the melt is maintained at a value between the glass temperature and the isotropic point. Thermotropic liquid-crystalline polymers are used as starting product. Among these are, in principle, all polymers which have mesogenic groups in the main and/or side chain and which can be processed from the liquid-crystalline melt phase. The orientation distribution and thus also the mechanical properties of the end product can be purposefully regulated by the electric field.

5 Claims, 2 Drawing Figures

THERMOPLASTIC PROCESSING OF THERMOTROPIC LIQUID-CRYSTALLINE POLYMERS UNDER THE INFLUENCE OF ELECTRIC FIELDS

This invention relates to a process for the production of mouldings by thermoplastic processing, by shaping, of thermotropic liquid-crystalline polymers, particularly by compression, moulding, spinning, extrusion or injection moulding.

In recent years, a large number of publications have been concerned with the synthesis (see eg. W. J. Jackson Jr, H. F. Kuhfuss, J. Polym. Sci. Polym. Chem. Ed. 1976, 14 2043; W. J. Jackson, Jr., British Polymer J., 1980, 154; U.S. Pat. Nos. 3,804,805; 4,153,779; 4,118,372) and the properties of liquid-crystalline polymers. A distinction is to be made here between lyotropic and thermotropic liquid-crystalline polymers. A lyotropic mesophase is obtained by mixing the polymer with a suitable solvent above a specific solids concentration; the thermotropic mesophase occurs in a particular temperature range above the hardening temperature. With the thermotropic LC-polymers, a further distinction is to made between the so-called main and side chain polymers, depending on whether the mesogenic group is incorporated in the polymer main chain or the polymer side chain.

With the conventional processing (extrusion, spinning) of liquid-crystalline polymers, a partial orientation of the mesogenic areas is obtained by the effect of mechanical fields (longitudinal and transverse speed gradients). Substantially irregularly orientated structures are present in the mouldings produced in this manne, which structures are produced by shearing varying in intensity and as a result of the complicated cooling process of the hot melt. Light- and electron microscopical shots show that the orientation via the wall cross section of the mouldings is uneven and not uniform. The mesogenic units are normally oriented in the vicinity of the moulding surface, to a greater extent in the direction of flow than in areas which are further from the surface, particularly in relation to the centre of the cross section. For the technological properties of the mouldings, it is of disadvantage that a purposeful, adjustable orientation distribution under the influence of mechanical fields is not possible or only to a very small extent.

A process has now surprisingly been found which allows the orientation distribution of the chains to be influenced in a moving melt i.e. achieved before and/or during and/or after the thermoplastic shaping. This is achieved by applying an electric field therefor to the polymer melt flowing through the shaping element. The electric field thereby influences the polymer melt en route to or from the shaping element (before or after), or the electric field is (preferably) impressed on within the shaping element of the melt. The orientation of the chains induced by the electric field, allows a wider and more varied purposeful influence of the structural organisation in relation to the mechanical induced orientation.

The object of the invention is to provide a process for the purposeful orientation of liquid-crystalline polymers in the thermoplastic processing thereof by electric fields.

Moreover, the object of the invention is to provide the mouldings produced according to the process of the invention, for example fibres, films, plates and injection mouldings.

The mouldings produced according to the process of the invention are characterised in that they have a defined adjusted degree of orientation f of from 0 to 1 and thus have purposefully adjusted mechanical properties. The degree of orientation f is conventionally defined by:

$$f = \frac{(3 \cos^2 \theta - 1)}{2}$$

$\theta$ is the angle between the chain axis and the direction of the field (director) causing the orientation. A possible variant of the process according to the invention allows, for example, the production of mouldings (f≐1) completely orientated in the direction of flow.

On the other hand, the process according to the invention allows the production of mouldings in which the chains or chain segments are predominantly orientated vertically to the direction of flow. In this case, the electric field is applied to the melt, vertically to the direction of flow.

For the process according to the invention, all those polymers are in principle suitable which have mesogenic groups in the main and/or side chain and which can be processed from the liquid-crystalline melt phase. The chemical structural units known from the literature (see H. Kelker, R. Hatz, Handbook of Liquid Crystals, Verlag Chemie, Weinheim, 1980) can be used as mesogenic groups.

Thermotropic liquid-crystalline polyesters are preferably used which contain 1 or several of the following units:

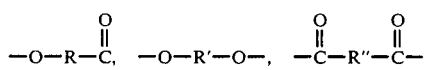

wherein R, R' and R" represent aromatic radicals of the general formula

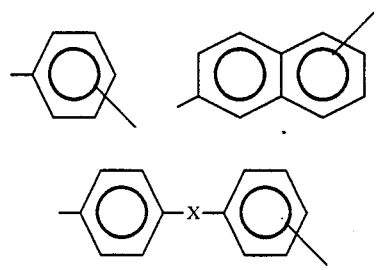

with

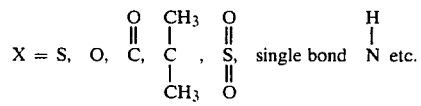

Moreover, those thermotropic liquid-crystalline polymers are suitable, which have at least one or several at the same time of the following physical effects in the electric field (direct current and alternating current):
 formation of "Williams Domanes"
 Dynamic scattering power
 Freedericksz Transitions.

The individual effects are described in the specialized literature and thus do not need to be described here in detail.

The following simple experimental arrangements are suitable as test processes for the selection of polymers suitable for the process according to the invention.

The arrangement described in H. Ringsdorf and R. Zentel, Makromol. Chem. 183, 1245 (1982), for example, is suitable for the investigation in the direct and alternating electric field. The relative light intensity is thereby determined from the variation in the temperature, the thermal and electrical past history, the voltage, the frequency and the time after applying the field. The examined temperature range extends from room temperature to the decomposition temperature of the polymer, the field intensity range from 10 V/cm to the polymer-specific electric breakdown field intensity, the frequency range extends from 0 Hz to 1 MHz. If, under these conditions, i.e. within the given temperature, field intensity and frequency range, an orientation effect (change in transmission of the light and/or change in morphology) occurs within a time range of 1 hour, preferably 10 min and particularly within 1 min, the corresponding polymer is then suitable for the process according to the invention.

The Faraday arrangement mentioned in C. Noel et al Polymer 22, 578 (1981) for example, is suitable for the investigation in the magnetic field. The change in force is thereby measured in a homogeneous magnetic field which acts on a sample with the susceptibility X. The magnetic susceptibility can be measured via the change in force from the known weight of the sample and the product of field and field gradients. The susceptibilities $X_{11,n}$ and $X_{\perp n}$ to the preferred direction are measured (director n), which represent material constants. The magnetic field intensity varies from 0 to 20 kG. A polymer is suitable for the process according to the invention when, within the given temperature and field intensity range, an orientation effect occurs, within less than 1 hour, preferably less than 10 minutes, particularly less than 1 minute.

The process according to the invention can in principle be applied to all methods for producing melt-spun threads, particularly the production of filament yarns, whereby drawing speeds of up to 6000 m/min can be applied. These melt-spinning processes are described, for example, in: B. V. Falkai; "Synthesefasern", Verlag Chemie, Weinheim, 1981.

In all these processes, the E-field and/or H-field can be applied parallel or vertical or in any other defined position to the drawing direction, which merely demands that the electrodes and/or coil forms be adapted to the desired orientation direction.

The process according to the invention is in principle suitable for the production of extrudates according to processes as described, for example, in McKelvey, J. M.; Polymer Processing", J. Wiley & Sons, N.Y. 1962. The application of E-fields and/or H-fields can take place here in a manner similar to that of spinning technology.

The process according to the invention is in principle suitable for the production of injection mouldings according to processes as described in the literature.

The E-fields and/or H-fields can thereby be arranged such that the melt flow from the nozzle to the moulding can be influenced.

The orientation distribution of the mesogenic groups can be purposefully influenced by the shape, size and number of electrodes or coils forms or variations in field intensity on the different electrodes.

All E-field intensities >10 V/cm are suitable for the process according to the invention up to the level of the polymer-specific electric breakdown field intensities.

The level of the magnetic fields is restricted by the technical and economical expenditure. Field intensities up to 2 kG can be obtained, however, without great difficulty.

The invention will now be described by means of drawings and examples.

Figure 2:
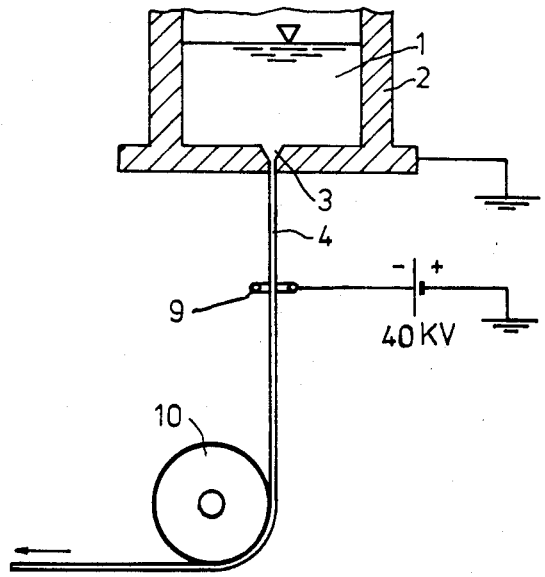

FIG. 1 schematically shows a device for melt-spinning thermotropic liquid-crystalline polymers, in which the direct electric field influences the melt parallel to the direction of flow, during and after shaping, and FIG. 2 shows a device for melt spinning thermotropic liquid crystalline polymers, in which the direct electric current influences the melt after shaping, parallel to the direction of flow, and is produced by a corona discharge.

For the production of a thermotropic liquid-crystalline polymer melt (LCP-melt), 194 g of p-hydroxy-benzoic acid, 48.6 g of hydroquinone, 40.7 g of 4,4'-dihyroxydiphenyl, 17.1 g of terephthalic acid, 0.55 g of zinc (II) acetate and 487.6 g of diphenyl carbonate are heated to 250° C. in a reaction vessel with stirrer and distillation bridge. After increasing the temperature to 295° C. and reducing the distillation speed, a vacuum of $0.5 \times 10^{-3}$ bars is slowly applied at this temperature within 1 hour and subsequently condensed for 1 hour. The product obtained has a distinct fibrous structure and is thermoplastically processible at temperatures of from 70° C. to 280° C.

This LCP-melt is spun to a thread with a device according to FIG. 1. For this purpose, the LCP-melt 1 is kept in a heated autoclave 2, under a pressure of 1 bar, at a temperature of 260° C. On the base of the autoclave 2 is a spinning nozzle 3 with a diameter of 1 mm. By the influence of shear force, the melt 1 is spun by means of the nozzle 3 to a thread 4, which is passed through a water bath 8 by means of the deflection rollers 5, 6, 7. The spacing between the spinning nozzle 3 and the surface of the water bath 8 is 50 mm. The drawing speed of the thread is about 1 m/min. A high tension of 30 kV is applied between the earthed autoclave 2 and thus also between the spinning nozzle 3 and the insulated water bath 8. The negative pole is connected to the water bath. In this manner, a strong electric field is produced in the thread 4, during and immediately after shaping, before the temperature of the thread 4 can fall below the glass temperature of the LCP-melt.

The orientation of the mesogenic areas of the threads produced in this manner is compared with that of threads of the same material which are produced without the influence of electric fields. For this purpose, the X-ray wide angle scattering is examined with a local dispersion detector and a multichannel analyser, the following parameters are thereby measured:

(a) angle-dispersive registering of the equator reflex and (b) registering of the intensity distribution of the equator reflex on the Debye circle.

The results are brought together in Table 1.

With the spinning apparatus according to FIG. 1, the electric field is active parallel to the direction of flow of the LCP-melt 1. In FIG. 2, a spinning apparatus is represented in which a direct electric field is produced in the direction of flow by a corona discharge. For this purpose, a thin wire ring 9 is positioned below the autoclave 2 with the spinning nozzle 3, which wire ring lies at a high voltage (40 kV) with respect to earth. The spacing of the wire ring 9 from the spinning nozzle 3 is again about 50 mm. The thread 4 is passed by means of the deflection roller 10 horizontal to the plane of the wire ring 9, through the central point thereof. A corona discharge takes place between the wire ring 9 and the thread 4. Ions are introduced by the corona discharge, which supply a current for the threads. The resulting potential gradient in the thread produces a direct field in a longitudinal direction.

The results of the X-ray wide angle scattering are also given in Table 1.

The threads produced under field influence according to FIG. 1 and FIG. 2 are clearly distinguishable both by the size of the coherence areas and by the orientation, from those which have been produced without electric field influence. The change in the morphological properties goes hand in hand with corresponding changes in mechanical properties, particularly elasticity and resistance to breaking.

TABLE 1

| Experiment | Results of the X-ray wide angle scattering | | |
|---|---|---|---|
| | coherence area [nm] | azimuthal width [degree] | orientation [degree$^{-1}$] |
| Comparative experiment without E-field | 3.6 | 125 | 0.008 |
| Experiment with device according to FIG. 1 (longitudinal E-field) | 4.5 | 19.7 | 0.051 |
| Experiment with device according to FIG. 2 (longitudinal E-field by means of corona discharge) | 5.3 | 18 | 0.056 |

We claim:

1. A process for the production of mouldings by thermoplastic processing, by shaping, of polymers, particularly by compression, moulding, spinning, extrusion or injection moulding, wherein thermotropic liquid-crystalline polymers are used as a starting product and that an electric magnetic field is allowed to take effect on the flowing polymer melt before and/or during and/or after shaping, the temperature of which polymer melt is maintained at a value between the glass temperature and the isotropic point.

2. A process according to claim 1, wherein direct or alternating electric fields take effect from 10 V/cm up to the polymer-specific breakdown field intensity.

3. A process according to claims 1 or 2, wherein those thermotropic liquid-crystalline polymers are used which have mesogenic groups in the main and/or side chain.

4. A process according to claims 1 or 2, wherein thermotropic liquid-crystalline polyesters are used which contain one or several of the following units:

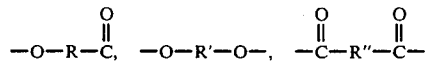

wherein R, R' and R" represent aromatic radicals of the general formula

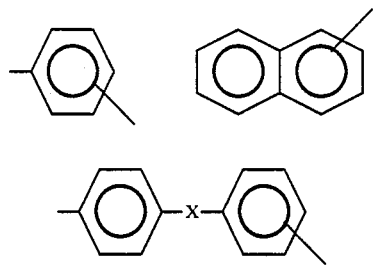

with

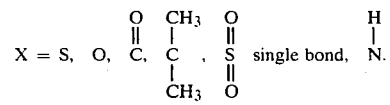

5. A process according to claims 1 or 2, wherein during cooling of the moulding, the electric field is maintained until the temperature of the moulding is below the glass temperature of the corresponding material.

* * * * *